UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

1,405,449.      Specification of Letters Patent.      Patented Feb. 7, 1922.

No Drawing.      Application filed June 9, 1921. Serial No. 476,306.

*To all whom it may concern:*

Be it known that I, PAUL C. SEEL, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While the ethers form thin solutions in benzol, it has been found that this solvent by itself will not dissolve a sufficient proportion of the ethers to make a desirably thick flowable composition or dope, such as may be used in the manufacture of photographic film base by the customary methods, or in the other plastic arts.

I have discovered that an adequately strong and useful solvent may be prepared by mixing benzol with methyl acetate. While the proportions may vary considerably, I find a useful range to be from 90 to 10 parts of benzol by weight to 10 to 90 parts of methyl acetate. In the preferred embodiment of my invention I use $66\frac{2}{3}$ parts of benzol to $33\frac{1}{3}$ parts of methyl acetate. Equal parts of these ingredients also are especially satisfactory.

The amount of cellulose ether dissolved in such mixed solvent may, of course, be widely varied. By way of example, I may dissolve 1 part of water-insoluble ethyl cellulose in 5 parts of the mixed solvent. Other substances which impart additional suppleness or incombustibility, or other qualities, to the film may be added to such a solution or dope, such modifying agents being, for instance, triphenyl or tricresyl phosphate, camphor, etc.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A solvent for cellulose ether, comprising a mixture of benzol and methyl acetate.

2. A solvent for alkyl ethers of cellulose comprising from 90 to 10 parts by weight of benzol and 10 to 90 parts by weight of methyl acetate.

3. A solvent for water-insoluble ethyl cellulose, comprising 2 parts by weight of benzol to 1 part by weight of methyl acetate.

4. A composition of matter, comprising cellulose ether dissolved in a mixture of benzol and methyl acetate.

5. A viscous flowable film-forming composition, comprising an alkyl ether of cellulose dissolved in a mixed solvent containing from 90 to 10 parts by weight of benzol and 10 to 90 parts by weight of methyl acetate.

6. A composition of matter, comprising water-insoluble ethyl cellulose dissolved in a mixture of benzol and methyl acetate.

7. A composition as set forth in claim 6 in which the benzol is present in 2 parts by weight to each part of methyl acetate.

Signed at Rochester, New York, this fourth day of June, 1921.

PAUL C. SEEL.